United States Patent [19]

Brown et al.

[11] 3,870,656

[45] Mar. 11, 1975

[54] PREPARATION OF SILICA-CONTAINING COMPOSITIONS

[75] Inventors: Terry D. Brown; Joseph A. Delap; Benny E. Nasser, Jr., all of Bartlesville, Okla.

[73] Assignee: Phillips Petroleum Company, Bartlesville, Okla.

[22] Filed: May 25, 1972

[21] Appl. No.: 256,900

[52] U.S. Cl. ............................... 252/451, 252/458
[51] Int. Cl. ..................... B01j 11/36, B01j 11/06
[58] Field of Search ............ 252/451, 458; 423/338, 423/339

[56] References Cited
UNITED STATES PATENTS

| | | | |
|---|---|---|---|
| 3,622,521 | 11/1971 | Hogan et al. | 252/458 X |
| 3,652,216 | 3/1972 | Krekeler et al. | 252/451 X |

*Primary Examiner*—C. Dees

[57] ABSTRACT

A method of preparing a silica-containing composition in which a hydrogel is formed and washed, and the water is separated from the hydrogel employing an organic compound and azeotropic distillation. Procedures for controlling the hydrogel washing and azeotropic distillation are disclosed.

10 Claims, 1 Drawing Figure

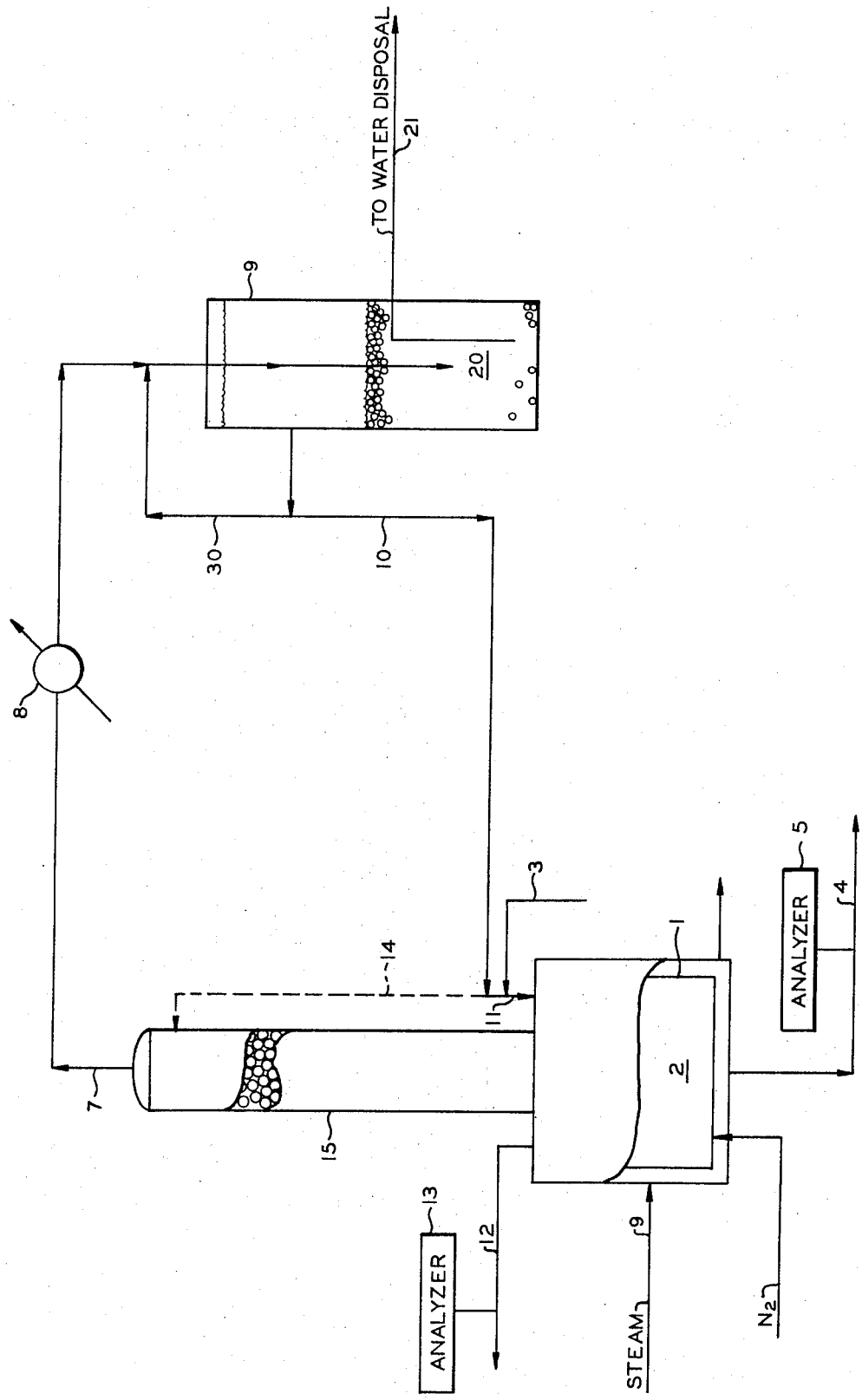

PREPARATION OF SILICA-CONTAINING COMPOSITIONS

This invention relates to the preparation of silica-containing compositions.

In one of its more specific aspects, this invention relates to improved techniques for producing silica-containing compositions which possess important advantages when employed as supports in various catalytic processes.

Among such processes are those relating to olefin polymerization in which a silica-supported, chromium-containing catalyst is contacted with an olefin such as ethylene. Disclosures relative to such processes are contained in U.S. Pat. Nos. 2,825,721, 3,225,023, and 2,840,551, and Canadian Pat. No. 853,414, all of which disclosures are incorporated herein by reference. One or more of the references disclose that the chromium and titanium can be incorporated on a silica support in the form of a chromium-containing organic compound or a titanium-containing organic compound.

It has recently been determined that preferred silica-containing supports can be produced by a procedure which involves introducing an alkali metal silicate solution into a mineral acid solution to form a hydrogel, aging the hydrogel, washing the aged hydrogel to produce a substantially alkali metalfree hydrogel and contacting the washed hydrogel with an oxygen-containing organic compound and separating the organic compound and water from the hydrogel to produce a silica-containing xerogel.

In various modifications of the process, various adjuvants, including titanium, can be incorporated in the hydrogel. Relatedly, some portion of the chromium compound can also be incorporated in the hydrogel.

The present invention relates to a method of incorporating a titanium-containing adjuvant in the hydrogel, to a method of controlling the washing of the hydrogel to produce the substantially alkali metal-free hydrogel and to procedures related to the separation of the water and organic compound from the hydrogel. More specifically, this invention relates to a method of preparing a silica composition in which an alkali metal silicate solution, such as one containing sodium or potassium silicate, is introduced into a mineral acid solution to form a hydrogel. The hydrogel is aged; the aged hydrogel is washed with dilute ammonium nitrite solution. The washing step is regulated by a monitoring system to ascertain the sodium content of the wash solution as indicative of the attainment of a substantially alkali metal-free hydrogel.

The hydrogel is then contacted with an oxygen-containing organic compound capable of forming an azeotrope with water. The resulting mixture is azeotropically distilled to produce the xerogel.

During the azeotropic distillation, the overhead stream comprising the water and organic compound is condensed and separated into a substantially water layer and a substantially organic compound layer. The latter is contacted by a water coalescing material to speed the separation of water droplets from the organic layer thus giving an organic compound layer containing some dissolved water, after which the solution is reintroduced into the distillation system.

The distillation is conducted in two stages. During the first, an azeotropic mixture is taken overhead and the separated organic compound containing some water is reintroduced into the kettle, or lower portion, of the column. When the water content in the distillation kettle has reached about the equilibrium level of water in the recycle liquid, as determined by analysis of the vapors from the kettle, recycle of the organic compound to the kettle is discontinued and recycle of the organic compound to the upper portion of the tower as reflux is begun. With introduction of recycle liquid is this manner as reflux, continued fractionation takes place until the amount of water in the condensing liquid reaches about 200 to about 2,000 parts of water per million parts of condensate. At this point, the distillation is discontinued and the organic compound is boiled from the gel, an inert gas being introduced, if desired, to facilitate the removal of organic compound from the gel.

In the method of this invention, the solution of the alkali metal silicate is introduced into the mineral acid solution to form a hydrogel. The concentration of the $SiO_2$ in the hydrogel which is formed is usually in the range of between about 3 and about 12 weight percent with the pH of the gel being from about 3 to about 9. Introduction is made at a temperature within the range of from about 33° F. to about 110° F.

The addition of the silicate solution can be made constantly or intermittently. In all instances, the silicate solution is added at such a rate that, on the average, from about 0.1 to about 15 weight percent of the total weight of the sodium silicate solution to be added to the acid is added per minute of addition time.

After gelling, the mixture is aged; this can be carried out at temperatures within the range of about 65° F. to about 200° F., with aging times greater than 1 hour being employed.

Following aging, the gel is washed, preferably with water and a dilute ammonium salt solution, to reduce the alkali metal content of the gel to less than about 0.1 weight percent and preferably to less than about 0.05 weight percent. Washing can be conducted in either a batch or continuous method.

The alkali metal content of the water from the washing step can be monitored and measured as a direct function of the alkali metal content of the gel; that is, washing is continued until the gel contains less than about 0.1 weight percent and preferably less than about 0.05 weight percent alkali metal. This is accomplished by correlating the quantity of wash water used with the quantity of gel being washed and ascertaining the alkali metal content of the gel in relation to that contained in the wash water.

The procedure of monitoring the alkali metal content of the hydrogel and the other aspects of this invention are illustrated in the attached drawing.

Referring now to the attached drawing, there is indicated vessel 1 in which the hydrogel 2 to be washed is contained. Ammonium nitrate solution is introduced through conduit 3 and a wash solution is withdrawn through conduit 4. The concentration of the alkali metal in the wash water is determined by analyzer 5 which can be any commercially available instrument suitable for such analysis, as for example, an Ionalyzer Digital pH meter available from W. H. Curtin and Company.

When the alkali metal concentration of the hydrogel has been decreased to the desired value, as indicated by the concentration of the alkali metal in the wash water to the analyzer, the hydrogel is contacted with an oxygen-containing organic compound which forms an azeotrope with water, such as ethyl acetate, either in vessel 1 or in another vessel. For simplification, it will be assumed that vessel 1 will be employed.

In vessel 1, the mixture of the hydrogel, water, and organic compound is azeotropically distilled and a mixture of water and organic compound vapors are taken overhead from column 15 through conduit 7; the vapors are condensed in condensing system 8. The resulting liquid mixture is introduced into phase separator or drum 9 which can be cooled to facilitate the separation. The organic compound, which contains about 3 to 3.5 weight percent water, is taken from the phase separator through conduit 10 and the water is routed to disposal through conduit 21.

Preferably, the phase separator has a coalescing material 20 positioned in its lower region and the mixture from the condensing system is introduced into the lower regions of the drum. The ethyl acetate, upon rising into the upper portion of the drum, passes in contact with the coalescing material and the separation of water droplets from the ethyl acetate is further facilitated. The ethyl acetate is withdrawn from the upper portion of the drum and recycled by suitable means through conduits 10 and 11 to the kettle of the distillation system. The separator can be by-passed by employment of conduit 30.

In order to determine that point at which the recycled hydrocarbon compound should be recycled to the distillation system as reflux to the upper portion of the tower as previously discussed, vapors are taken from the vessel through conduit 12, condensed and introduced into analyzer 13 for water determination. This analyzer can be such as Panametric Aluminum Hygrometer Model 1,000.

When it has been determined that the water content of the kettle vapors has reached a level of about 3 to 3.5 weight percent, the recycling of the organic material through conduits 10 and 11 is discontinued and the introduction of the organic material into the upper section of the column through conduits 10 and 14 is begun. Fractionation is continued in this manner until the water level in the vapors from the kettle is about 200 to about 2,000 ppm. The recycle of the organic material is then discontinued and the contents of the kettle are boiled dry to produce the substantially water-free xerogel.

While the above description constitutes the best mode for carrying out the invention, it will be evident that various modifications can be made to the method of such invention and that the various methods defined herein can be employed regardless of how the hydrogel is prepared. Also, the hydrogel can be prepared with either the mineral acid or the alkali metal silicate containing either a chromium-containing compound or a titanium-containing compound, or both. Relatedly, either or both of a titanium-containing compound or a chromium-compound can be introduced into the hydrogel, preferably after washing, the chromium and titanium being retained therein during the azeotropic distillation and being activated by the activation procedure to which the composition is subjected after recovery as a xerogel or after the incorportion of the xerogel with a chromium-containing compound, the activated composition being active for olefin polymerization according to the processes described in the aforementioned patents.

These, and other such modifications, are considered to be within the scope of the invention.

What is claimed is:

1. A method of preparing a silica-containing composition which comprises:
    a. forming a hydrogel comprising silica;
    b. contacting said hydrogel with an organic compound to form a composite comprising silica and an azeotropic mixture of water and said organic compound;
    c. distilling said composite in a distillation zone to produce an overhead stream comprising said organic compound and water and to produce a xerogel;
    d. passing said overhead stream into contact with a coalescing material to separate water from said organic compound;
    e. passing said organic compound from contact with said coalescing material to said distillation zone; and,
    f. recovering said xerogel from said distillation zone as said silica-containing composition.

2. The method of claim 1 in which said hydrogel is formed by introducing an alkali metal silicate into an acid, and said hydrogel is washed to produce a wash water containing an alkali metal and the alkali metal content of said wash water is measured.

3. The method of claim 2 in which a chromium-containing compound is contained in said acid or in said alkali metal silicate.

4. The method of claim 2 in which a titanium-containing compound is contained in said a cid or in said alkali metal silicate.

5. The method of claim 1 in which a chromium-containing compound is introduced into said hydrogel.

6. The method of claim 1 in which organic compound is introduced into said distillation zone at a first locus and at a second locus.

7. The method of claim 6 in which the introduction of said organic compound into said distillation zone is discontinued and said organic compound is removed from said distillation zone in the absence of the introduction of said organic compound into said distillation zone.

8. The method of claim 2 in which the alkali metal content of said hydrogel is reduced to a concentration less than about 0.1 weight percent prior to said distillation.

9. The method of claim 6 in which said organic compound is passed into said distillation zone until the water content within said distillation zone is within the range of from about 3 to about 3.5 weight percent.

10. The method of claim 1 in which said organic compound is ethylacetate.

* * * * *